Aug. 30, 1966
H. C. SWIFT
3,269,490
COMBINED HYDRAULIC AND MECHANICAL BRAKE
Filed July 9, 1964
3 Sheets-Sheet 1
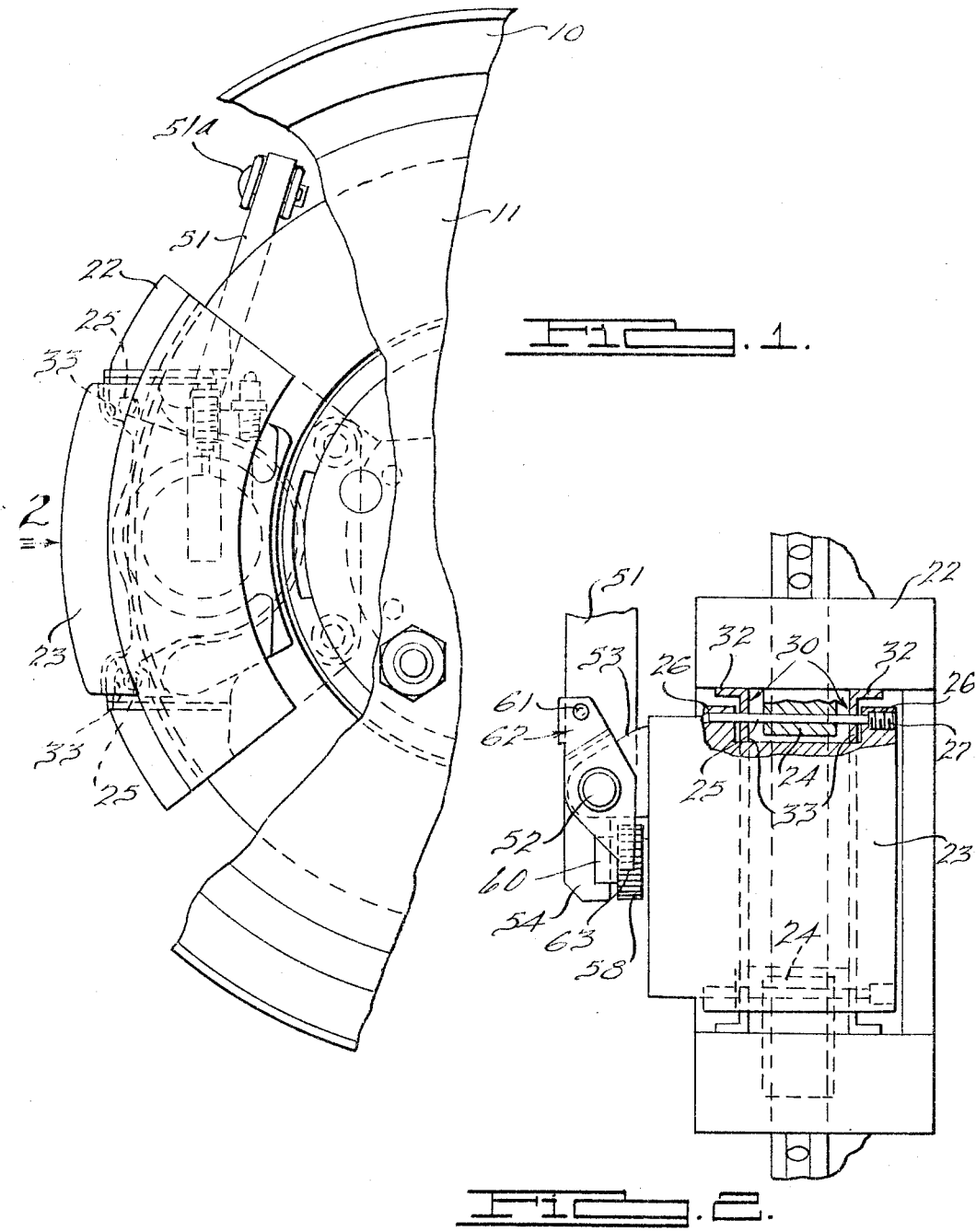
INVENTOR.
Harvey C. Swift.
BY
Harness, Dickey & Pierce
ATTORNEYS.

INVENTOR.
Harvey C. Swift.
BY
Harness, Dickey & Pierce
ATTORNEYS.

Aug. 30, 1966  H. C. SWIFT  3,269,490
COMBINED HYDRAULIC AND MECHANICAL BRAKE
Filed July 9, 1964  3 Sheets-Sheet 3
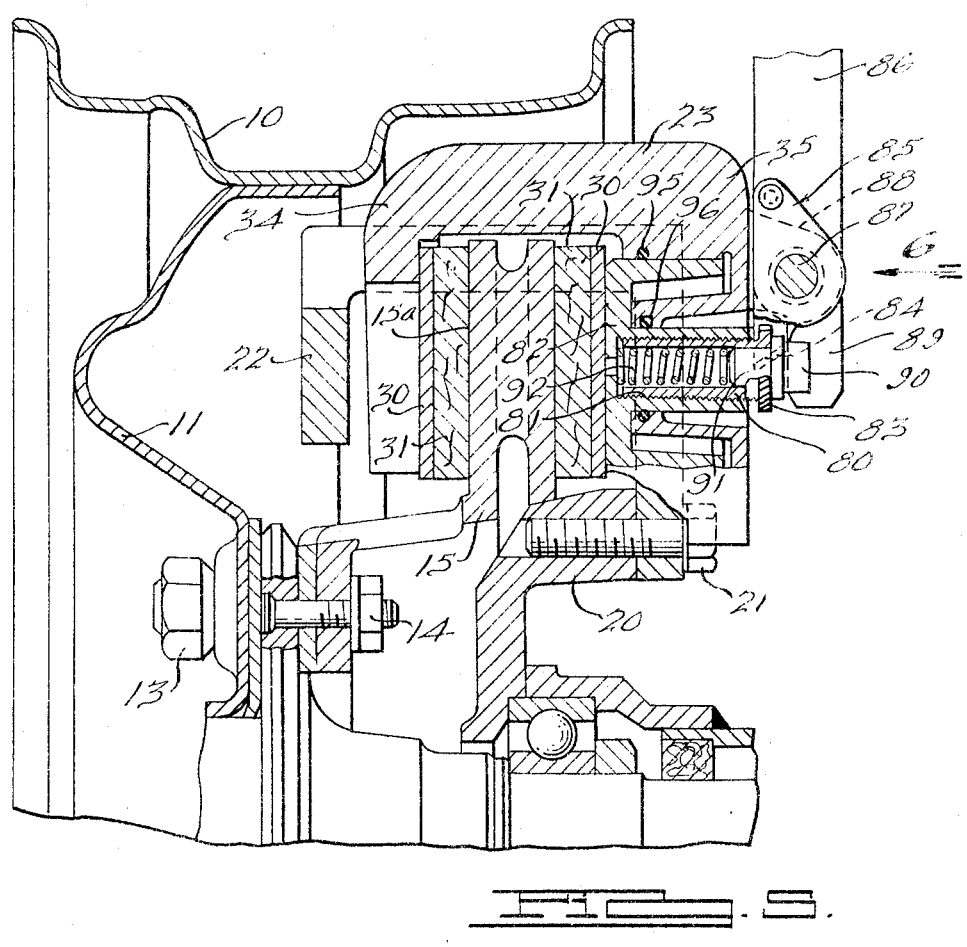
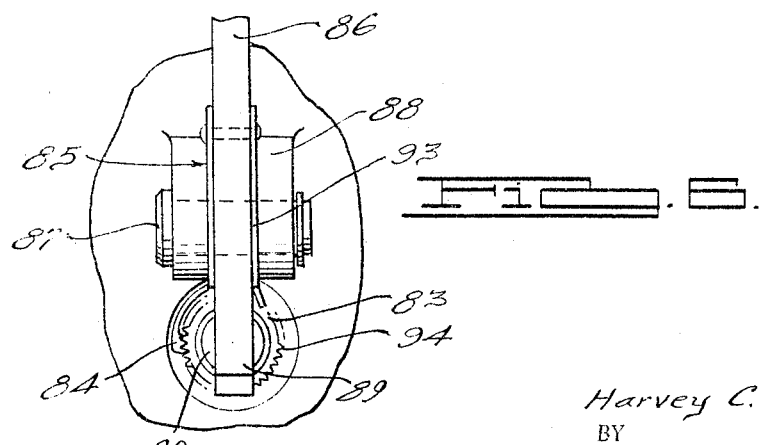
INVENTOR.
Harvey C. Swift
BY
ATTORNEYS.

United States Patent Office 3,269,490
Patented August 30, 1966

3,269,490
COMBINED HYDRAULIC AND MECHANICAL
BRAKE
Harvey C. Swift, Birmingham, Mich., assignor to Kelsey-Hayes Company, Romulus, Mich., a corporation of Delaware
Filed July 9, 1964, Ser. No. 381,456
4 Claims. (Cl. 188—73)

This invention relates to brakes of the disk type and more particularly to a combined hydraulic and mechanical brake wherein the mechanical brake is usually employed as a parking or emergency brake.

When hydraulically operated disk brakes are employed, difficulties have been encountered in associating the emergency or parking brake therewith. Such difficulties have been partially solved by employing disk brakes for the front wheels and drum and shoe type brakes for the rear wheels because of the relative ease with which the parking brake can be integrated with the drum and shoe type brake. Such an arrangement, however, presented new problems. The combination of disk type and drum type brakes produced a mismatched set of brakes because the operating characteristics of disk and drum type brakes are different, particularly in the higher ranges. Also, with a given pedal pressure, the disk brakes were applied first due to the inertia of the brake shoes in the drum and shoe type brakes. The necessitated the use of reducing valves or other types of control devices in the hydraulic system which complicated it and added to the cost thereof.

It is, therefore, a primary object of this invention to provide a hydraulically operated disk brake having a mechanically operated parking or emergency brake combined therewith in such a manner that each brake actuating mechanism may be operated independently of the other and wherein the combined brakes and actuating means therefor are consolidated and assembled into a unit which may be economically manufactured, quickly and easily assembled and installed, and in which maintenance costs are reduced to a minimum.

The above and other objects and advantages of the invention are attained by a construction comprising a torque member secured to a stationary part of the axle housing and slidably supporting a floating head or yoke for movement in the direction of the axis of the wheel. This floating head or yoke carries a piston for actuating one brake shoe and transfers the reaction of the piston to the other brake shoe. The brake shoes engage a rotor or brake disk connected to a rotating part of the wheel axle.

Associated with the piston is an extensible member actuated by a pawl and ratchet mechanism which, in turn, is operated by the mechanical brake adjusting lever. This arrangement is such that when the mechanical brake is applied, and there has been sufficient wear on the brake shoe linings, the pawl picks up a new tooth on the ratchet and, upon return of the brake adjusting lever to its position of rest, the pawl and ratchet mechanism is actuated to increase the length of the extensible member to compensate for wear on the brake shoe linings.

The construction and arrangement of the parts is such that the mechanical brake actuating and adjusting means may be conveniently consolidated with the brake actuating piston and quickly and easily assembled therewith in a compact manner.

The various objects and advantages, and the novel details of construction of two commercially practical embodiments of the invention, will become more apparent as this description proceeds, especially when considered in connection with the accompanying drawings, in which:

FIGURE 1 is a fragmentary elevational view of a disk brake constructed in accordance with this invention.

FIGURE 2 is an elevational view looking in the direction of the arrow 2 in FIGURE 1;

FIGURE 5 is a view similar to FIGURE 3 of a slightly modified form of construction; and FIGURE 6 is a view similar to FIGURE 3 looking in the direction of arrow 6.

Figure 3:
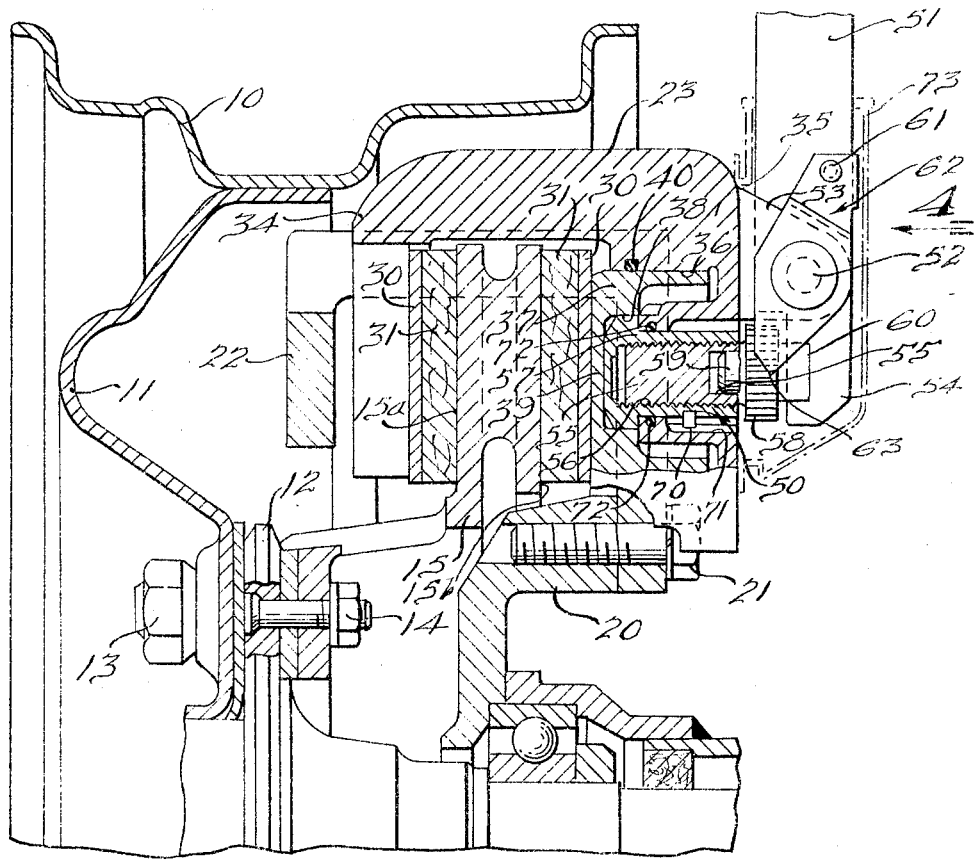
FIGURE 3 is a fragmentary sectional view of the brake.

The disk brake of this invention is shown as being associated with a vehicle wheel having a rim 10 and a wheel body 11 secured to an axle flange 12 by means of studs or bolt and nut assemblies 13. Also secured to the axle flange 12 by means of studs or bolts 14, for rotation with the wheel 11, is a brake disk 15. The brake disk 15 is of the ventilated type having spaced braking walls 15a and 15b.

The reference character 20 indicates generally a torque member or spider which is secured to a fixed part (not shown) of the axle structure. Secured to the outer periphery of the torque member or spider 20 by means of bolts 21 or the like is a caliper-like housing or member 22.

This caliper-like housing or member 22 straddles a portion of the periphery of the brake disk 15 and slidably supports a floating head or yoke 23, which is substantially C-shaped. The caliper member 22 is provided at each end with a boss 24 adapted to receive and support a rod 25, the ends of which are engaged in ears 26 formed on the adjacent ends of the floating head or yoke 23. Each supporting rod or pin 25 is secured in place by being threaded as at 27 into one of the ears 26, as best shown in FIGURE 2. The caliper member or housing 22 is fixed, but the floating head or yoke 23 is movable relative thereto on the supporting pins 25 in the direction of the axis of the wheel, for a purpose which will become more apparent hereinafter.

Each brake shoe consists of a backing plate 30 carrying a friction lining 31 adapted to engage the braking surfaces 15a and 15b of the brake disk 15; see FIGURE 3. The brake shoes are supported on the pins 25 so as to be slidable thereon toward and away from the brake disk. To accomplish this, each brake shoe is provided at each lateral edge thereof with an extension 32 each provided with a slot 33 slidably engaging the supporting pin 25.

The C-shaped floating head or yoke member 23 constitutes a force transmitting member. This member 23 had one leg 34 thereof engaging one of the brake shoes. The other leg 35 is provided with a recess 36 forming a cylinder to slidably receive a piston 37. The piston 37 is provided with an internal recess or bore 38 and a closed end 39 adapted to engage the other brake shoe. When fluid under pressure is admitted to the cylinder 36, behind the piston 37, the piston is moved to the left, as viewed in FIGURE 3 and the closed end 39 directly engages the adjacent brake shoe to move it against the brake disk. The reaction of this movement of the piston operates in the opposite direction to move the floating head or yoke 23 to the right so that the leg 34 thereof moves the other brake shoe into engagement with the brake disk. Thus, both brake shoes are actuated simultaneously by the use of a single piston.

The piston 37 may be provided with a packing 40, preferably in the form of an O-ring, between it and the cylinder 36.

The present invention relates more particularly to the means for manually adjusting the brake shoes so that the brake may be employed as a parking or emergency brake and for adjusting the brake shoes to compensate for wear on the brake shoes.

Figure 4:
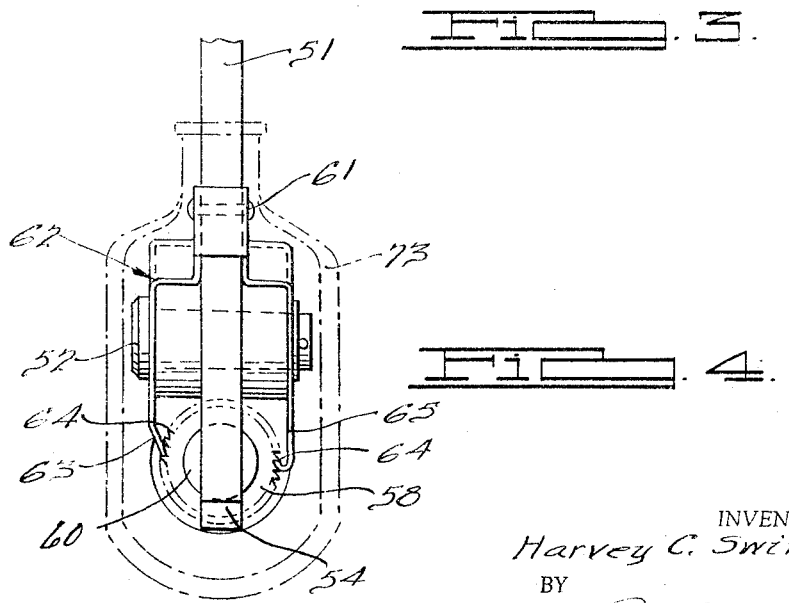
FIGURE 4 is a detail elevational view of the pawl and ratchet mechanism looking from the right of FIGURE 3 in the direction of arrow 4.

In FIGURES 3 and 4, there is an extensible member indicated generally by the reference character 50 connecting a mechanical brake applying lever 51 to the piston 37. This brake actuating lever 51 is pivoted as at 52 to a bracket 53 and has a free lower end 54.

The extensible member 50 comprises a shaft 55 which has a threaded connection 56 with a sleeve 57 which engages the bore 38 of the piston and is arranged in abutting relation with the end 39 of the piston. The extensible member 50 is extended by rotating the shaft 55 relative to the sleeve 57. For accomplishing this, the shaft 55 is formed at its outermost end with an integral ratchet in the form of a ratchet wheel 58. The ratchet wheel 58 encircles a stub shaft 59, one end of which is fixed in a recess in the shaft 55 and the other end 60 of which is slotted to receive the free end 54 of the brake actuating lever 51.

Secured to the pivot 52 and also at 61 to the lever 51 is a pawl member 62 which has a pawl 63 adapted to engage the teeth 64 on the ratchet wheel 58. The other arm of the pawl member 62 is provided with a dog 65 which also engage the teeth 64 to prevent any counter-rotation of the ratchet wheel 58.

When the mechanical brake actuating lever 51 is actuated to apply the brakes, its upper end moves to the right, as viewed in FIGURE 3, and its lower end moves to the left, as viewed in this figure. This may be accomplished by a conventional cable assembly indicated at 51a connected to the upper end of the lever 51 at one end and to a manual parking brake lever or other suitable operator (not shown) at its other end.

This movement advances the piston to apply the brakes in a manner similar to that produced by hydraulic actuation of the piston. This movement of the lower end 54 of the lever 51 also swings the pawl 63 in a slightly upward direction and if the brake shoe linings are sufficiently worn and the movement is great enough, the pawl 63 engages another tooth 64. Thus, when the lever 51 is moved back to its position of rest illustrated in FIGURE 3, the pawl 63 will move downwardly in engagement with the ratchet wheel 58 to move the ratchet wheel one tooth space. This also rotates the shaft 55 to move the same outwardly with respect to the sleeve 57 to thus lengthen or extend the extensible member 50. Thus, when the mechanical brake lever 51 is actuated, if the brake shoe linings 31 have become worn, the movement of this lever and hence the movement of the pawl member 62 and the pawl 63 will be sufficient to move the pawl 63 one tooth space so that when the lever 51 is returned to its normal position of rest, the pawl will rotate and operate to extend the extensible member and move the piston 37 closer to the adjacent brake shoe. It will be obvious that during this movement, the dog 65 engages the ratchet teeth 64 on the opposite side to prevent any retrograde or counterrotation of the shaft 55.

In order to prevent rotation of the extensible member 50 yet permit it to move axially, it is preferably provided with a pin 70 which engages an axially extending slot 71 formed in an adjacent portion of the yoke 23 and limits its movement to longitudinal movement.

A packing 72, preferably in the form of an O-ring, is provided between the sleeve 52 and the adjacent portion of the caliper structure. If desired, a flexible boot 73 may be provided to surround the pawl and ratchet mechanism to prevent the access of foreign material thereto.

The modification shown in FIGURES 5 and 6 operates in substantially the same manner. In this construction, a sleeve member 80 has a threaded connection 81 with the piston 82. The end of the sleeve member 80 is provided with an integrally formed ratchet wheel 83 which is adapted to be engaged by the angular helical pawl 84 on a pawl member 85 secured to a mechanical brake actuating lever 86. The brake actuating lever is pivoted as at 87 to a bracket 88 and is provided with a lower free end 89 which engages the slotted portion 90 of a plug 91 carried at one end of the sleeve member 80 in a manner permitting rotation of the sleeve. An anti-rattling spring 92 is arranged in the sleeve 80 and bears against the plug 91 to hold the parts tightly together and prevent any rattling movement thereof. The ratchet mechanism is provided with a dog 93 which engages the teeth opposite the angular helical pawl 84 to prevent any retrograde movement of the ratchet wheel 83. The teeth on the ratchet wheel 83 are indicated by the reference character 94.

The piston 82 is preferably sealed by an O-ring 95 and an O-ring seal 96 is positioned between the piston and the adjacent portion of the caliper.

In this construction, when the lever 86 is moved to the brake applying position, the lower free end 89 thereof will move in an upward arc so that the angular helical ratchet or pawl member 84 will, if the movement is sufficient, pick up a new tooth on the ratchet wheel 83 so that when the lever 86 is returned to its normal position, the ratchet wheel 83 will be rotated one tooth space to unthread the sleeve 80 from the piston and lengthen the extensible member to compensate for wear on the brake shoes, as in the previously described construction.

In the commercial embodiments of the invention illustrated herein, the mechanical brake actuating lever 51 or 86 usually extends in the general direction as shown in FIGURES 1 and 2. However, in FIGURES 3 and 5, the levers 51 and 86 are shown 90° out of position relative to their assembled location on the vehicle and brake so that the connections between these levers and the remainder of the structure might be more clearly illustrated.

From the foregoing description of the two embodiments of this invention, it will be readily apparent that there is provided a simple pawl and ratchet means connecting the brake actuating lever to the piston. The connection comprises an extensible member, the rotatable part of which is actuated by the return movement of the brake actuating lever. The adjustment of the extensible part of the extensible connection tends to lengthen the extensible connection so that upon the next application of the brakes, any wear on the brake shoes will be compensated for. The pawl and ratchet mechanism is arranged closely adjacent one end of the caliper and is so consolidated therewith as not to provide any untoward projections.

While two commercially practical embodiments of the invention have been described and illustrated herein somewhat in detail, it will be understood that various changes may be made as may come within the purview of the accompanying claims.

What is claimed is:

1. A disk brake for wheels comprising, a brake disk rotatable with the wheel, a stationary torque member, a pair of brake shoes supported by said torque member for movement toward and from said brake disk, a piston for actuating one of said brake shoes, extensible means including a rotatable part within and engaging said piston, ratchet means associated with said extensible means and positioned outside said piston, pivotal lever means having a pawl mounted thereon and engageable with said ratchet means, whereby substantial pivotal movement of said lever extends said extensible means.

2. A brake as defined in claim 1 wherein said extensible means includes a nonrotating member engaging said piston, and a rotating member threadedly engaging said nonrotating members, said ratchet means fixed to said rotating member.

3. A brake as defined in claim 1 wherein said extensible means includes a rotating member threadedly engaging said piston, said ratchet means fixed to said rotating member.

4. A brake as defined in claim 2 wherein said nonrotating member is a sleeve and said rotating member is threadedly received therein.

References Cited by the Examiner
UNITED STATES PATENTS

| | | | |
|---|---|---|---|
| 1,852,174 | 4/1932 | Lyman et al. | 188—79.5 |
| 2,389,618 | 11/1945 | Goepfrich | 188—196 |
| 2,820,530 | 1/1958 | Chouings et al. | 188—73 |
| 2,822,892 | 2/1958 | Clark | 188—196 |
| 3,059,731 | 10/1962 | Gancel et al. | 188—73 |
| 3,158,234 | 11/1964 | Henderson | 188—196 |
| 3,169,608 | 2/1965 | Press et al. | 188—72 |

FOREIGN PATENTS

| | | |
|---|---|---|
| 1,348,468 | 12/1963 | France. |
| 984,436 | 2/1965 | Great Britain. |

MILTON BUCHLER, *Primary Examiner.*

G. E. A. HALVOSA, *Assistant Examiner.*